United States Patent [19]

Kraus

[11] 4,225,812
[45] Sep. 30, 1980

[54] ELECTRIC MOTOR CONTROL SYSTEM
[75] Inventor: Frederick L. Kraus, Louisville, Ky.
[73] Assignee: General Electric Company, Louisville, Ky.
[21] Appl. No.: 757,050
[22] Filed: Jan. 5, 1977
[51] Int. Cl.³ ............................................. H02B 7/00
[52] U.S. Cl. ...................................... 318/349; 34/48; 68/12 R; 310/68 C; 318/334; 318/473; 318/516
[58] Field of Search ...................... 361/25, 26, 33, 34; 318/334, 349, 358, 359, 47.1, 225 A, 514–516; 134/56 D, 57 D, 58 D; 310/68 C; 68/12 R; 34/400

[56] References Cited
U.S. PATENT DOCUMENTS

| 2,157,417 | 5/1939 | Kneisley . | |
|---|---|---|---|
| 2,369,986 | 2/1945 | Schaefer | 361/25 |
| 2,613,343 | 10/1953 | Ober . | |
| 2,630,553 | 3/1953 | Seely . | |
| 2,735,023 | 2/1956 | Kozinski . | |
| 3,130,326 | 4/1964 | Moore . | |
| 3,241,026 | 3/1966 | Andrich . | |
| 3,255,672 | 6/1966 | Wantz et al. | 134/57 D |
| 3,638,090 | 1/1972 | Ebbinge | 318/349 |

OTHER PUBLICATIONS

Lytel, A. *Electronic Motor Control*, Photo Fact Publication, pp. 20–21. Nov. 64.

*Primary Examiner*—David Smith, Jr.
*Attorney, Agent, or Firm*—Radford M. Reams

[57] ABSTRACT

An electric motor of predetermined voltage rating is connected to an electric current supply source higher in voltage than the rated motor voltage in series with a voltage dropping resistor controlled by a thermal relay responsive to motor temperature. The series circuit is regulated by the relay to include or exclude the resistor thereby to maintain motor temperature at normal rated value.

1 Claim, 3 Drawing Figures

ELECTRIC MOTOR CONTROL SYSTEM

BACKGROUND OF THE INVENTION

1. Field of the Invention

My invention relates to electric motor control systems, and particularly to means for operating an electric motor of predetermined rated voltage (or voltage range) at line voltages continuously above the highest motor voltage rating.

2. Description of the Prior Art

Household appliances, such as refrigerators, dishwashers, washing machines and the like include electric motors of selected standard ratings designed to operate without undue temperature rise at a supply voltage of predetermined magnitude, or at voltages within a predetermined range of magnitudes. Normal source voltages at some locations are somewhat different than at others, and may be continuously or frequently above the rated voltage, or voltage range of the standard motor of nearest rating. A motor connected directly to such a source will overheat in operation. In order to avoid the need for special motors in applications where supply voltage varies widely or normally exceeds the voltage rating of an available standard motor it is desirable to provide means for operating a motor of predetermined voltage rating from a supply source having a voltage greater in magnitude than the highest motor voltage rating.

Accordingly, it is a principal object of my invention to provide improved control means for operating an electric motor without overheating from a source of electric current supply having a voltage magnitude normally or frequently above the highest rated voltage of the motor.

It is a more specific object of my invention to provide an improved motor control circuit for electric dishwashers of the "static" cycle type having an electric driving motor and an electric heating coil operable during non-overlapping time intervals.

SUMMARY OF THE INVENTION

In carrying out my invention in one preferred embodiment, I utilize a thermal relay responsive to motor temperature and having normally closed contacts to connect an electric motor of predetermined voltage rating directly to a source of electric current supply having a voltage normally somewhat greater than the highest voltage for which the motor is rated. When actuated by excessive motor temperature the thermal relay interrupts the direct connection of the motor and inserts in series circuit relation with the motor a voltage dropping resistor having only sufficient resistance to reduce motor terminal voltage to approximately rated magnitude. The resistor may be inserted by selectable connection through normally open contacts of the thermal relay or by opening a normal shunting circuit through the normally closed contacts.

BRIEF DESCRIPTION OF THE DRAWINGS

My invention will be more fully understood and its various objects and advantages further appreciated by referring now to the following detailed specification taken in conjunction with the accompanying drawing in which.

DESCRIPTION OF THE PREFERRED EMBODIMENTS

Figure 1:
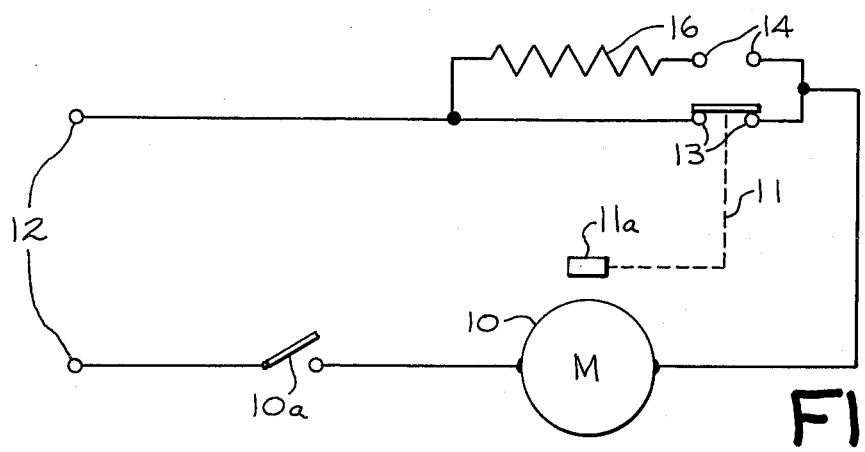
FIG. 1 is a schematic circuit diagram of an electric motor control circuit embodying my invention.

Referring now to the drawing, and particularly to FIG. 1, I have shown an electric motor 10 either of the direct or alternating current type adapted to be connected through a suitable manually or automatically operable control switch 10a and a thermal relay 11 to a like source of electric current supply represented by a pair of line terminals 12. The thermal relay 11 is provided with a pair of normally closed "cold" contacts 13 closed when the motor 10 is at a predetermined normal operating temperature or less and a pair of normally open or "hot" contacts 14 closed when the motor temperature is greater than such predetermined temperature. The relay 11 is actuated between its hot and cold position by any suitable thermal responsive element, such as a motor winding probe 11a. In the cold position of relay 11 the contacts 13 connect the motor 10 directly across the line terminals 12. In the hot position of relay 11 the contacts 14 connect the motor 10 across the line terminals 12 in series circuit relation with a voltage dropping resistor 16.

Figure 2:
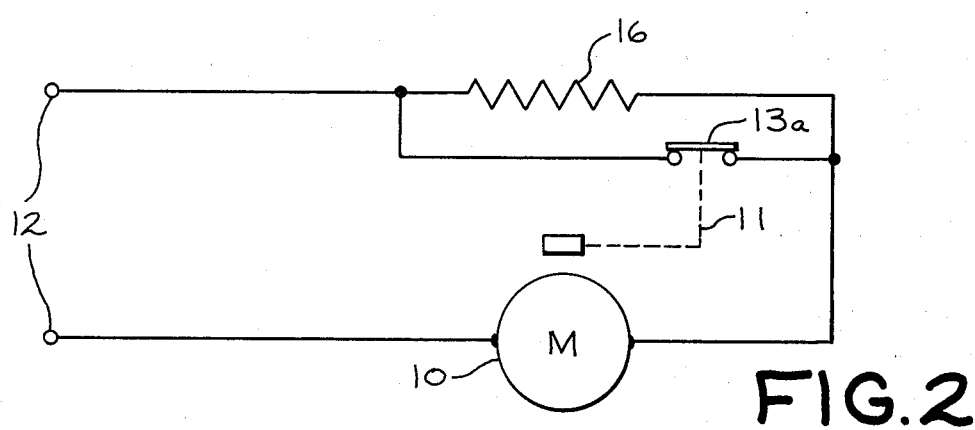
FIG. 2 is a schematic circuit diagram of an electric motor control circuit embodying my invention in modified form.

At FIG. 2 I have shown another embodiment of my invention wherein the resistor 16 is fixedly connected in series circuit relation with the motor 10 between the line terminals 12 and the thermal relay 11 is provided with a single pair of normally closed contacts 13a. Contacts 13a are arranged when closed to shunt, or short-circuit, the resistor 16. It will be evident to those skilled in the art that in the motor circuit shown at FIG. 2 the thermal relay contacts 13a could, if desired, be arranged to shunt only a predetermined portion of the resistor 16. In such cases only the shunted portion of resistor 16 serves as a controllable voltage dropping resistor, the unshunted portion serving as a fixed voltage dropping resistor. It will be evident that in the appended claims, when reference is made to a voltage dropping resistor the controllable portion only of such a partially shunted resistor is referred to.

The electric current supply source connected to line terminals 12 may be either a DC source or an AC source, as appropriate for energization of the motor 10, and of a voltage magnitude normally greater than the voltage rating of the motor. If the motor is rated for operation over a predetermined normal range of supply voltage magnitude the current supply source may have a voltage above that range. For example, if the motor 10 is rated for operation at 220 volts to 240 volts my invention provides for its operation from source voltage normally somewhat above 240 volts, such as 260 volts. The invention is also useful with source voltages normally within the rating range but subject to frequent increase above 240 volts.

In the usual application, of course, for any predetermined source voltage that standard motor having a voltage rating less than source voltage and nearest to it is selected. If the motor is rated appreciably higher than source voltage it will overheat. In operation of control circuits as shown at FIGS. 1 and 2, when the source voltage at line terminals 12 is of a magnitude within the normal operating voltage rating of motor 10 the thermal relay 11 retains its contacts 13 (or 13a) closed, thereby to connect the motor 10 directly to the line terminals. If, however, the voltage magnitude at line terminals 12 is above the highest voltage rating of motor 10 the motor will tend to overheat. Whenever motor temperature exceeds a predetermined maximum rated temperature, the thermal relay 11 will open its contacts 13 (or 13a). In the case of FIG. 2, such opening itself will insert resistor 16 in series with the motor 10 across the line terminals 12. In the case of FIG. 1, the thermal relay 11 inserts the resistor 16 in series with the motor 10 by closing its normally open contacts 14. In each case insertion of the resistor 16 in series with the motor 10 appropriately reduces the voltage at the motor terminals to a magnitude within the normal range of rated motor voltage. The resistor should, of course, be of such resistance that it will reduce voltage at the motor terminals only to normal rated voltage and not significantly below that voltage.

With the resistor 16 thus inserted in series with the motor, the motor temperature will fall to a normal rated magnitude, so that the thermal relay 11 will drop out and close its normally closed (i.e. direct connection) contacts 13 (or 13a). In this direct connection to a higher than rated voltage supply source the motor 10 will again heat up sufficiently to pick up relay 11 and repeat the cycle. In this manner thermal relay 11 will regulate to maintain the temperature of motor 10 at a predetermined value equal to or below its maximum rated temperature.

While I have shown the motor 10 schematically as a direct current motor or a single phase alternating current motor by way of illustration, it will be understood by those skilled in the art that, if desired, the motor may be a suitable multiphase alternating current motor for connection to a multiphase supply source through a voltage dropping regulator resistor of suitable multiphase type.

My invention has particular application to domestic electric appliances, and especially to electric dishwashing apparatus subject to use in widely separated geographic areas where service entrance voltage may be of different normal magnitudes or may be subject to wide over-voltage and under-voltage variations.

Figure 3:
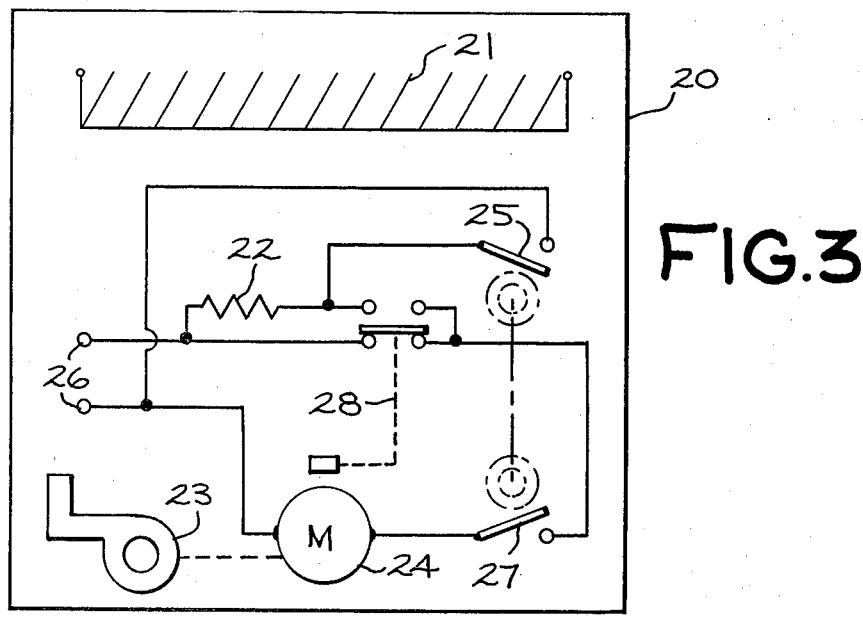
FIG. 3 is a schematic illustration of an electric dishwasher including an electric driving motor connected for energization in accordance with my invention.

At FIG. 3 I have shown by way of example a schematic illustration of a dishwasher 20 having a dish rack 21, a heating resistor 22 and water pump 23 driven by a motor 24. The heating resistor 22 is controlled by a suitable cycle timer switch 25 for connection to and disconnection from line terminals 26. The motor 24 is similarly connected to and disconnected from line terminals 26 at appropriate times by a cycle timer switch 27. As at FIG. 1 a thermal relay 28 determines whether the motor 24 is connected to the line terminals 26 directly or through a voltage dropping resistor. In the dishwasher apparatus shown at FIG. 3 the heating resistor 22 is utilized also as the voltage dropping resistor in a regulating circuit of the type shown at FIG. 1. It will be understood by those skilled in the art that such dual utilization of the heating resistor 22, while most convenient, is feasible only in so-called "static" washer cycles wherein the resistor is energized at full line voltage (i.e. as a heater) through the cycle timer switch 25 only during the drying cycle, at which time the motor 24 is disconnected from the line by the cycle timer switch 27.

While I have shown and described certain preferred embodiments of my invention by way of illustration, many modifications will occur to those skilled in the art. I, therefore, wish to have it understood that I intend in the appended claims to cover all such modifications as fall within the true spirit and scope of my invention.

What I claim as new and desire to secure by Letters Patent of the United States is:

1. In an electric washing apparatus of the static wash cycle type including a plurality of line terminnals, a motor of predetermined voltage rating subject to being connected to a source of electric current supply normally having a voltage which exceeds the voltage rating of said motor by a limited amount, a resistor having sufficient current carrying capability and having a sufficiently low resistance value to pass sufficient current to operate said motor when connected in series therewith, said resistor being alternatively connectable either directly across said supply source to act as a heating resistor for the washing apparatus or in series with said motor to act as a voltage-reducing resistor, a cycle timer for disconnecting said motor from said line terminals and connecting said resistor directly across said line terminals during a first operating cycle and for connecting said motor across said line terminals during a second operating cycle, a thermal relay responsive to motor temperature during said second operating cycle for connecting said resistor in series circuit relation with said motor whenever said motor temperature exceeds a predetermined normal operating temperature and for shunting said resistor whenever said motor temperature is equal to or less than said normal operating temperature leaving said motor connected directly across said line terminals.

* * * * *